(12) United States Patent
Tatamiya et al.

(10) Patent No.: US 7,525,594 B2
(45) Date of Patent: Apr. 28, 2009

(54) CAMERA HAVING MODE-SELECTING POWER-CONTROLLING BUTTONS

(75) Inventors: Hisashi Tatamiya, Saitama (JP); Takashi Matsuda, Saitama (JP)

(73) Assignee: Hoya Corporation, Tokyo (JP)

( * ) Notice: Subject to any disclaimer, the term of this patent is extended or adjusted under 35 U.S.C. 154(b) by 572 days.

(21) Appl. No.: 11/208,628

(22) Filed: Aug. 23, 2005

(65) Prior Publication Data

US 2006/0044462 A1 Mar. 2, 2006

(30) Foreign Application Priority Data

Aug. 24, 2004 (JP) ............................ P2004-243559

(51) Int. Cl.
    *H04N 5/225* (2006.01)
(52) U.S. Cl. ...................................... 348/372; 348/373
(58) Field of Classification Search .................. 348/372
    See application file for complete search history.

(56) References Cited

U.S. PATENT DOCUMENTS

| 4,739,417 | A | 4/1988 | Ogawa | |
|---|---|---|---|---|
| 6,067,116 | A | 5/2000 | Yamano et al. | |
| 7,046,230 | B2* | 5/2006 | Zadesky et al. | ............. 345/156 |
| 7,342,611 | B2* | 3/2008 | Larner et al. | ................. 348/372 |
| 2002/0089591 | A1* | 7/2002 | Kurahashi | ..................... 348/207 |
| 2003/0081142 | A1* | 5/2003 | Iijima | .......................... 348/372 |
| 2003/0142228 | A1* | 7/2003 | Flach et al. | .................. 348/335 |
| 2004/0027466 | A1* | 2/2004 | Mizobuchi | ............... 348/231.4 |
| 2004/0051807 | A1* | 3/2004 | Niwa | ........................... 348/372 |
| 2005/0128345 | A1* | 6/2005 | Larner et al. | ................. 348/372 |
| 2005/0201746 | A1 | 9/2005 | Kurosawa | |

\* cited by examiner

*Primary Examiner*—David L Ometz
*Assistant Examiner*—Pritham Prabhakher
(74) *Attorney, Agent, or Firm*—Greenblum & Bernstein, P.L.C.

(57) ABSTRACT

A camera has a power switching processor for switching on and off the power supply, a mode-setting processor for setting a selected mode among a plurality of mode, and a plurality of buttons, each corresponding to one mode. When one of the buttons is pushed in a state where the power supply is off, the power switching processor switches the power supply on, and the mode-setting processor sets the selected mode corresponding to the pushed button. When one of the buttons is pushed in a state where the power supply is on, the mode-setting processor changes the selected mode to the mode corresponding to the pushed button. Further, when a specific operation, carried out by pushing at least one of the buttons, which is different from an operation or changing the selected mode, is performed, the power switching processor switches the power supply off.

15 Claims, 5 Drawing Sheets

CAMERA HAVING MODE-SELECTING POWER-CONTROLLING BUTTONS

BACKGROUND OF THE INVENTION

1. Field of the Invention

The present invention relates to a camera for photographing objects, and more particularly relates to a camera capable of entering a selected mode among a plurality of modes.

2. Description of the Related Art

Recently, it is known that many types of digital cameras have various functions, for example a digital camera having the function of photographing a moving picture and recording sound. These types of cameras are usually provided with a power switch for switching the power supply on and off, and a mode switch for changing the mode for setting the desired functions.

However, when the moving picture image is photographed using these types of cameras for example, if the power supply to the digital camera is off, the power switch has to be pushed at first and next the selected mode has to be changed to a moving picture mode for photographing a moving picture. Namely, two operation devices have to be operated for photographing a moving picture image. Therefore the operation of these types of cameras is difficult for a user, and it takes a long time to start to photograph the object. Accordingly, if the photographed object moves fast, an opportunity for photographing it is sometimes lost.

Furthermore, there are many operation devices on a digital camera when the digital camera has various functions. Due to this, the user often makes a mistake when he/she operates the operation device.

Conventionally, it is known that the switch system of the digital camera is modified for easily operating the operation devices as shown in U.S. Pat. No. 6,067,116 for example. The digital camera in this document is provided with a monitor cover which can be opened and close. In this camera, when the monitor cover is opened the power supply is on. On the other hand, when the monitor cover is closed the power supply is off. Due to this, one operation in this digital camera can cause two effects, namely not only opening or closing the monitor cover but also switching power supply on or off.

However, in this digital camera, the monitor cover has to be opened at first and next the selected mode has to be changed to the moving picture mode when a moving picture is photographed. Therefore, in this camera it can take a long time to start to photograph the object.

SUMMARY OF THE INVENTION

Therefore, an object of the present invention is to provide a camera, in which the power supply is switched on and the selected mode is entered when one operation of one operation device in carried out.

According to the present invention, there is provided a camera, entering one selected mode among a plurality of modes, when a power supply to the camera is on. The camera has two or more buttons, each corresponding to a mode, a power switching processor that switches the power supply, and a mode-setting processor that sets a selected mode among the plurality of modes. In this camera, when one of the buttons is pushed in a state where the power supply is off, the power switching processor switches the power supply on, with the mode-setting processor setting the selected mode corresponding to the pushed button. When one of the buttons which does not correspond to the selected mode is pushed in a state where the power supply is on, the mode-setting processor changes the selected mode to a mode corresponding to the pushed button. And when a specific operation, carried out by pushing at least one of the buttons, which is different from an operation for changing the selected mode, is performed in a state where the power supply is on, the power switching processor switches the power supply off.

The specific operation is preferably carried out by pushing one of the buttons continuously for a longer period than a predetermined time. The specific operation is preferably carried out by simultaneously pushing two buttons among more a plurality of modes.

When the camera is set to a specified mode, the camera carrier out a function corresponding to the specified mode. And when the camera is sets to an other specified mode, the camera carries out the function corresponding to the other specified mode.

The plurality of modes includes a still picture mode for photographing a still picture, a moving picture mode for photographing a moving picture, and sound recording mode for recording sound for example.

The camera can have a lens barrel and a camera lens which is provided inside the lens barrel. When the mode-setting processor sets a predetermined mode the lens barrel is set in an extended position, and when the mode-setting processor sets another predetermined mode the lens barrel is set in a retracted position, preferably. In this case, when the specific operation is performed in a state where the mode-setting processor has set another predetermined mode, preferably the lens barrel is extended at first and is then retracted to the retracted position and the power supply is turned off. Furthermore, the predetermined mode is the still picture mode or the moving picture mode for example.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
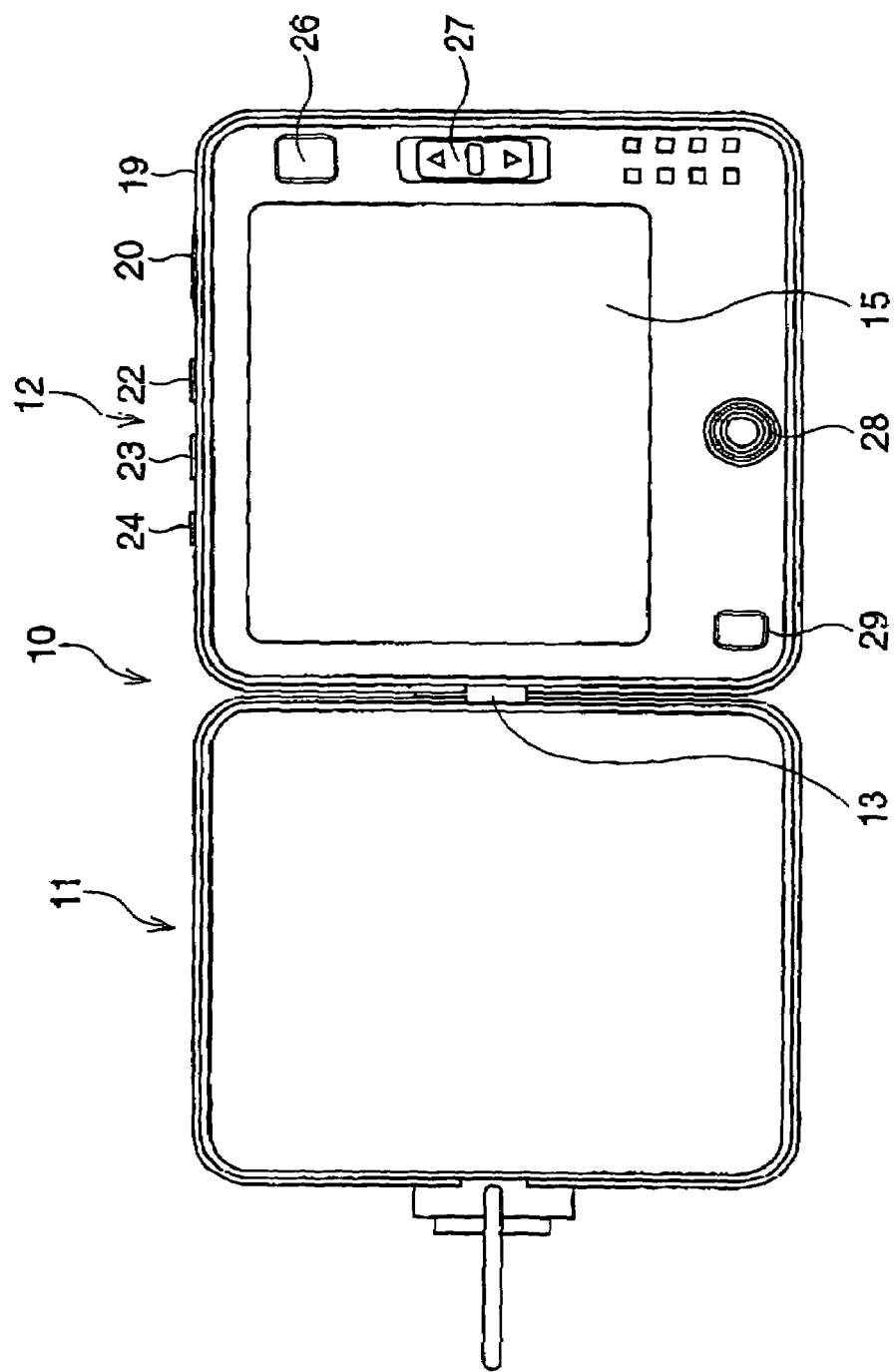
FIG. 1 is a back plan view, showing a digital camera in one embodiment of this invention.

The present invention will be described below with reference to the embodiments shown in the drawings.

Figure 2:
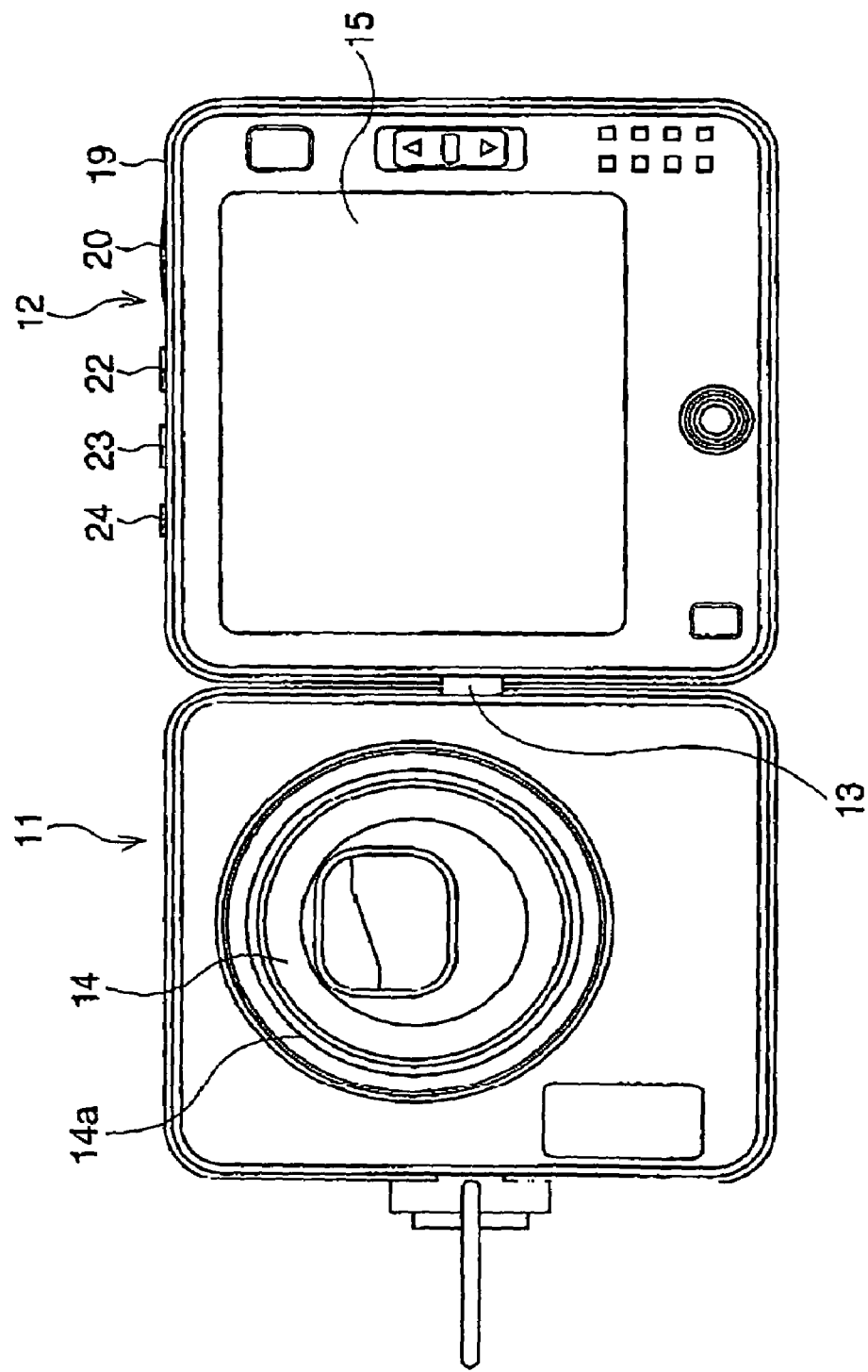
FIG. 2 is a back plan view, showing the digital camera when a photographic unit is rotated half around relative to a monitor unit from the state of FIG. 1.

FIGS. 1 and 2 are back plan views, showing a digital camera in one embodiment of this invention. The digital camera 10 is composed of a photographic unit 11 having the photographic optimal system 14 and a monitor unit 12 having a liquid crystal monitor 15. The photographic unit 11 is connected with the monitor unit 12 by an axis portion 13. The photographic unit 11 is capable of twisting relative to the monitor unit 12 around the axis portion 13.

The photographic and monitor units 11 and 12 have a front surface and a back surface. The back surface of the monitor unit 12 is disposed on the same plane as the back surface of the photographic unit 11 is, as shown in FIG. 1. The photographic unit 11 is rotated halfway around relative to the monitor unit 12 from the state shown in FIG. 1, so that the back surface of the monitor unit 12 is disposed on the same plane as the front surface of the photographic unit 11 is, as shown in FIG. 2. As shown in FIGS. 1 and 2, the liquid crystal monitor 15 is provided on the back surface of the monitor unit 12, and the photographic optical system 14 is provided on the front surface of the photographic unit 11. The photographic optical system 14 has a lens barrel 14a and camera lens 14b (referred to FIG. 4) inside the lens barrel 14a. In FIG. 2, the lens barrel 14a is retracted in the photographic unit 11 but is capable of extending from the front surface of the photographic unit 11.

Several operation devices, which are provided on the back surface of the monitor unit 12, surround the liquid crystal monitor 15. Namely, a replay switch button 26 and a zoom switch 27 are provided on the right side of the monitor 15. A four-way controller 28 and menu switch button 29 are provided on the bottom side of the monitor 15.

Figure 3:
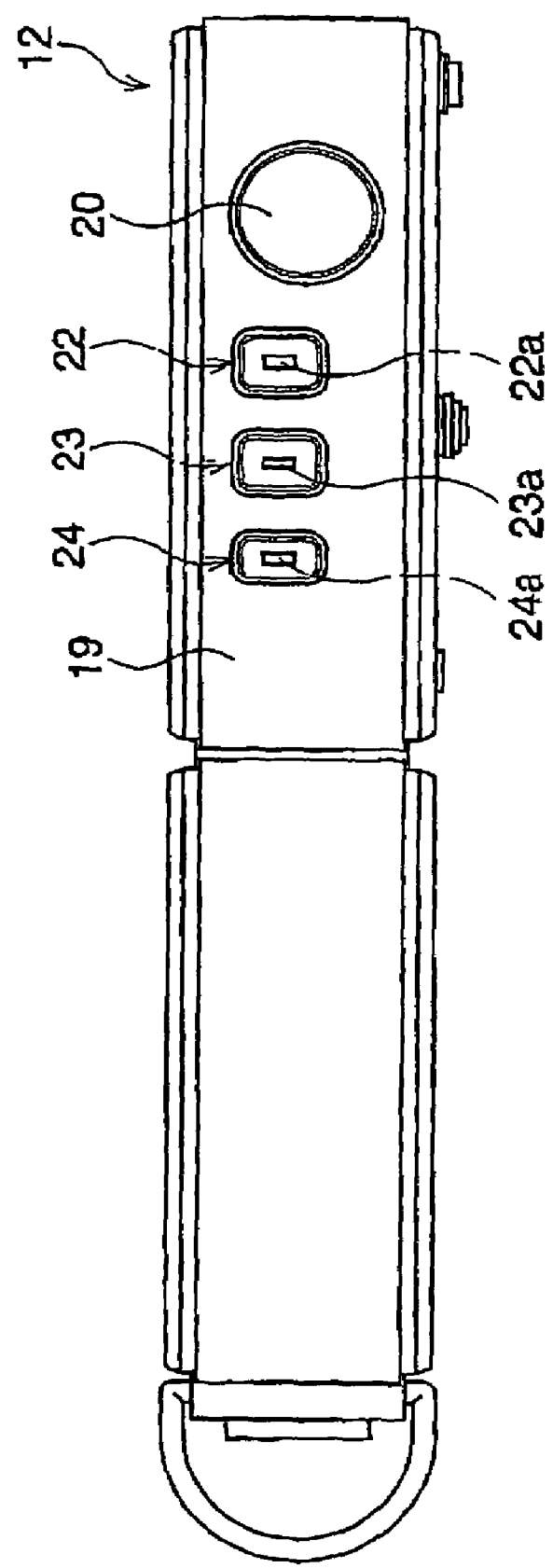
FIG. 3 is an upper surface view, showing the digital camera in the state that it is in, in FIG. 1.

FIG. 3 is the upper surface view of the digital camera 10 in the state that the digital camera 10 is in, in FIG. 1. A release button 20 is provided on the right side of an upper surface 19 of the monitor unit 12. Mode buttons, namely a sound record button 22, a moving picture button 23, and a still picture button 24, which are arranged in sequence from the right side, are provided at the left side of the release button 20 on the upper surface 19. By operating these buttons, the digital camera 10 enters one selected mode among a plurality of modes including a sound recording mode for recording sound, a moving picture mode for photographing a moving picture, and a still picture mode for photographing a still picture. When the digital camera 10 is set to a specified mode, the digital camera 10 carries out a function corresponding to that specified mode. And when the digital camera 10 is set to an other specified mode, the digital camera 10 carries out the function corresponding to that other specified mode. The sound record button 22, the moving picture button 23, and the still picture button 24, which ogre a push-button, are provided with luminous portions 22a, 23a, and 24a respectively at the center thereof. The luminous portions 22a, 23a, and 24a, which are composed of an LED (light emitting diode), radiate light respectively when the sound recording mode, the moving picture mode, or the still picture mode is set.

The digital camera 10 in this embodiment is not provided with the power switch for switching on the power supply to the digital camera 10. Accordingly, in this embodiment, the power supply is switched by operating any one of three buttons 22, 23, and 24 for setting the selected mode.

Namely, when one of the three buttons 22, 23, and 24 is pushed in a state where the power supply to digital camera 10 is off, the power supply is switched on while setting the selected mode corresponding to the pushed button. Therefore, when the sound record button 22 is pushed in a state where the power supply is off, the power supply is switched on while setting the selected mode to the sound recording mode. Similarly, when the moving or still picture button 23 or 24 is pushed, the power supply is switched on while setting the selected mode to the moving or still picture mode, respectively.

On the other hand, the three buttons 22, 23, and 24 are used for changing the selected mode when the power supply is on. Namely, when one of the three buttons 22, 23, and 24 which does not correspond to the selected mode is pushed in a state where the power supply is on, the selected mode is changed to the mode corresponding to the pushed button. For example, when the still picture button 24 is pushed in a state where the selected mode is the sound recording mode, the selected mode is changed to the still picture made from the sound recording mode. Further, if one of three buttons 22, 23, and 24 which corresponds to the selected mode is pushed, the selected mode is not changed.

The three buttons 22, 23, and 24 are used for switching the power supply off when the power supply is on. In this embodiment, when one of three buttons 22, 23, and 24 is continuously pushed for a longer period than a predetermined period in a state where the power supply is on, the power supply is switched off.

Figure 4:
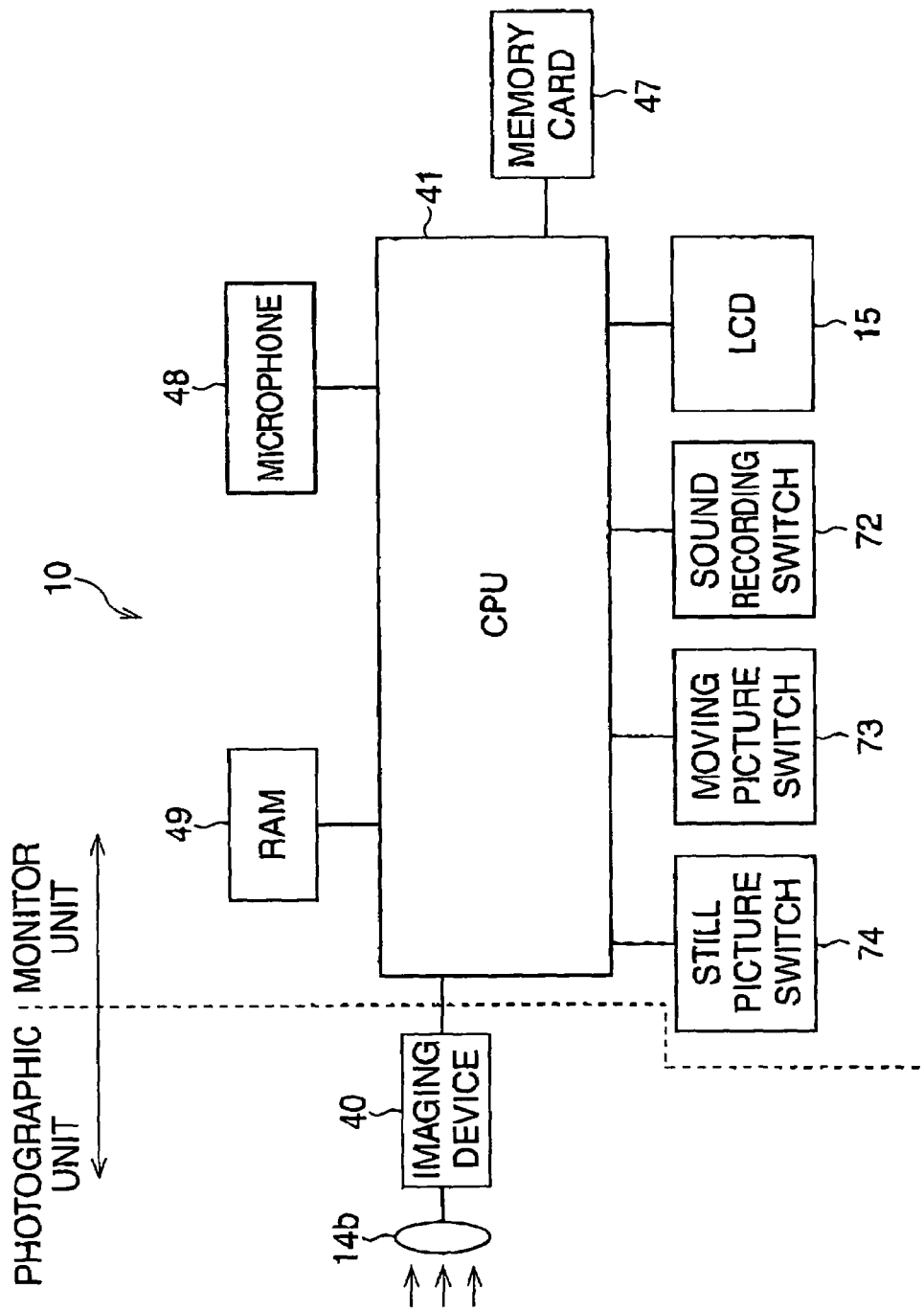
FIG. 4 is a block diagram of a digital camera in this embodiment.

FIG. 4 is a block diagram of a digital camera in this embodiment. The digital camera 10 is controlled by a CPU 41 and is supplied electric power from a electric power source (not shown in Figs.). The digital camera 10 has the camera lens 14b and a CCD (imaging device) 40 which is disposed backward to the camera lens 14b and on the optical axis thereof. In the moving picture mode, or the still picture mode, reflected light from the object is received at the imaging device 40 through a lens 14b. At the imaging device 40 the received light is converted to image signals corresponding to the received light, and then these image signals are input to the CPU 41. The image signals are processed according to a predetermined image processing so as to convert them to display image data. The display image data is temporarily stored in SRAM 40, and then it is displayed on the monitor 15 as a through image. In the moving picture mode, or the still picture mode, the objected is photographed if the release button 20 is pushed. Namely, the image signal which is converted from the reflected light at the image device 40, ins temporarily stored in a RAM 49. The stored image signal is processed according to a predetermined image processes, and then is recorded in a memory card 47 as the moving picture image or the still picture image.

A microphone 48 is connected to the CPU 41. In the sound recording mode, sounds are picked up by the microphone 48. The picked-up sounds are converted to digital signals. The digital signals are input to a RAM 49 through the CPU 41, and are temporarily stored therein as sound information. After that, the sound information is input to the memory card 47 and is recorded therein.

A sound record switch 72, a moving picture switch 73, and a still picture switch 74 are connected to the CPU 41. While one of the sound record button 22, the moving picture button 23, and the still picture button 24 is being pushed respectively, one of these three switches 72, 73, and 74 is activated and inputs an ON-signal being different to each other to the CPU 41. According to the ON-signal from the switches 72, 73, and 74, the power supply (namely, the supply of electric power to the digital camera 10) is switched on or off and, the selected mode is changed at the CPU 41. Further, the other switches corresponding to operation devices disposed on the monitor unit 12 and the luminous portions 22a, 23a, and 24a are also connected to the CPU 41 (not shown in FIG. 4).

Figure 5:
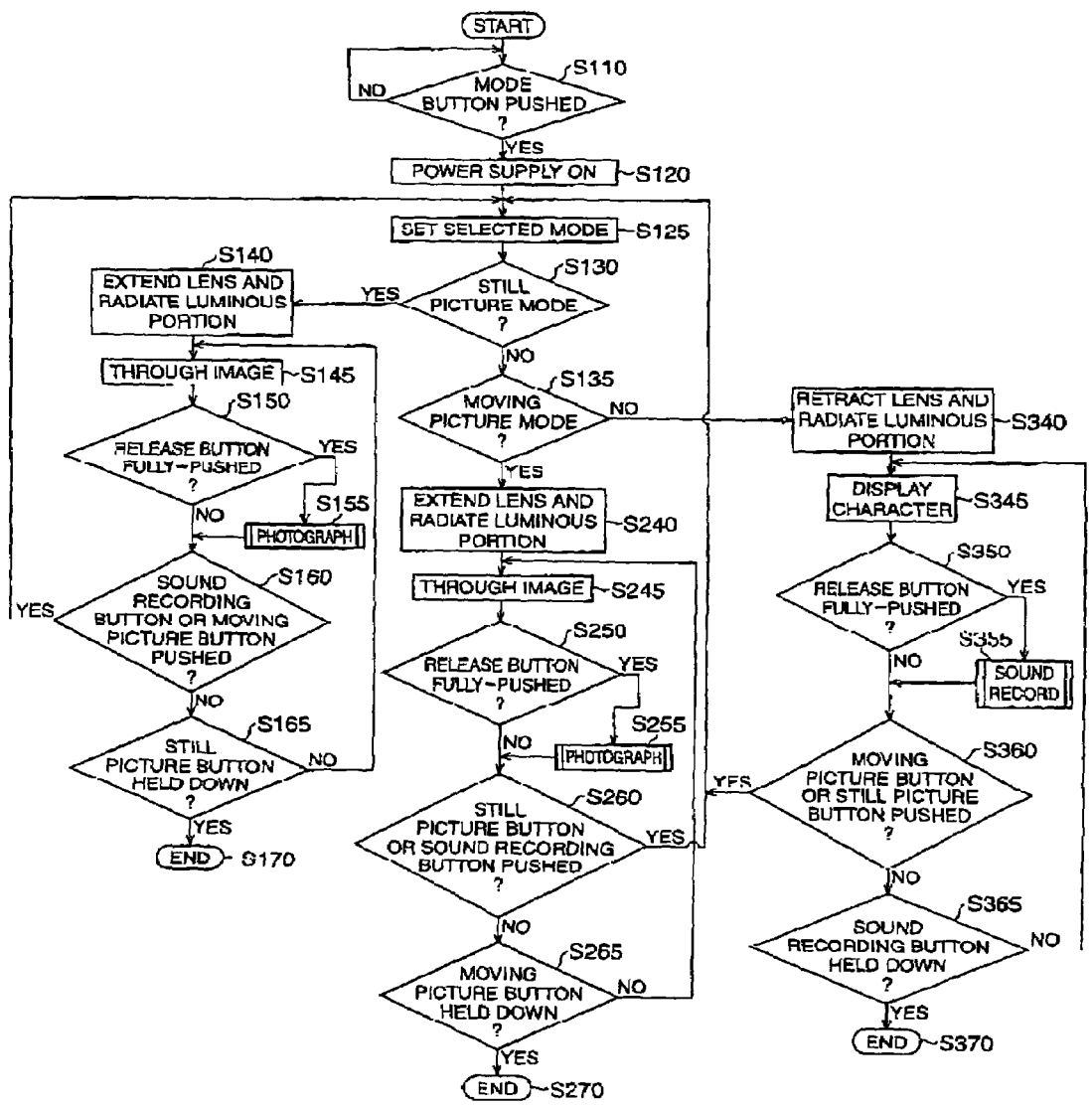
FIG. 5 is a flowchart of the routine in a digital camera.

FIG. 5 shows a flowchart of the routine in the digital camera 10. In this routine, at first whether one of the mode buttons is pushed, namely whether one of switches 72, 73, and 74 is activated is determined at step S110. Unless the mode switches are not activated, the electric power is not supplied to the digital camera 10 and this routine waits at step S110. If one of switches 72, 73, and 74 is activated, this routine goes to stop S120. At step S120, the power supply to the digital camera 10 is switched on at first. Next, which switch is activated is determined and the mode corresponding to the activated switch is set to the selected mode at step S125. At steps S130, and 135, the selected mode is read, and if the selected mode is the still picture mode the routine goes to step S140 and the digital camera enters the still picture mode. If the selected mode is the moving picture mode the routine goes to step S240 and the digital camera enters the moving picture mode. If the selected mode is the sound recording mode the routine goes to step S340 and the digital camera enters the sound recording mode.

In the still picture mode, the luminous portion 24a is radiated for indicating the selected mode is the still picture mode. Next, the lens barrel 14a is extended from the front surface of the photographic unit 11, for receiving the reflected light from the object, if the lens barrel 14a is set in the retracted position at S140. On the other hand, if the lens barrel 14a has been already extended, it is not moved at this step. At stop S145, the display image data corresponding to the reflected light from the object is displayed on the monitor 15 as a through image. At step 150, whether the release button is fully-pushed is determined. Unless the release button is fully-pushed, the routine goes to step S160. If the release button is fully-pushed, the routine goes to step S155 and the objected is photographed as the still picture image. Namely, the exposure of the digital camera 10 is corrected and the lens 14b is adjusted for focusing the lens. After that the imaging device 40 converts the reflected light from the object, through the adjusted lens 14b based on the corrected exposure, to converted image signals. After that, the image signals are processed according to the predetermined image so as to convert to the image data. The image data is recorded in the memory card 17 as the still picture image and then the routine goes to step S160.

At step S160, whether one of the sound record switch 72 and the moving picture switch 73 is activated is determined. If one of these switches 72 and 73 is activated, the routine goes back to step S125, and the selected mode corresponding to the activated switch is set at step S125.

At step S165, whether the still picture button 24 has been held down is determined. Namely, whether the still picture switch 74 is activated is determined at first. If the switch 74 is activated, how long the switch 74 has been continuously activated is confirmed. And then if the switch has been activated longer than a predetermined time (for example 0.8 second), it is judged that the user wants to switch the power supply off, therefore the routine goes to step S170. At step S170, the power supply is switched off and the lens barrel 14a is retracted in the photographic unit 11.

If one of the sound record button 22, and the moving picture button 23 is held down in the still picture mode, the routine goes back to the step S125 at first and then whether these buttons have been held down is determined at step S265 or S365 as described below. Therefore, whether the sound record button 22, and the moving picture button 23 have been held down is not determined at step S165.

If the digital camera enters the moving picture rode (the routine goes to below step S240), the lens barrel 14a is extended and the luminous portion 23a is radiated at step S240, similar to step S140. At step S245, the through image is displayed on the monitor 15. Next, at step S250 whether the release button 20 is fully-pushed is determined. If the release button 20 is fully-pushed, the routine goes to S255. At step S255, the moving picture image is photographed and recorded, until the release button is fully-pushed again or until the predetermined time (for example 30 second) is passed. Namely, the reflected light from the object is successively converted to image signals. The image signals are processed according to the predetermined image processes so as to be converted to image data. The image data is displayed on the monitor 15 and is stored in the RAM 49 temporarily. The stored image data is read and recorded in the memory card 47 after the photograph is finished.

At seep S260, whether one of the still picture switch 74 and the sound record switch 72 is activated is determined. If one of these switches 74 and 72 is activated, the routine goes back to step S125, and the selected mode corresponding to the activated switch is set at step S125. At step S265, whether the moving picture button 23 has been held down is determined, similar to step S165. If the button 23 has been held down, the power supply is switched off and the lens barrel 14a is retracted in the photographic unit 11 at step S270.

If the routine goes to step S340 (the camera enters the sound recording mode), the luminous portion 22a is radiated at first. Next, the lens barrel 14b is retracted if the lens barrel 14b is extended, because of not using the lens 14a in the sound recording mode. Further, the lens barrel 14b is not moved, if it has been already set in the retracted position. At step S345, the character, which indicates that the digital camera 10 is in the sound recording mode at present, is displayed on the monitor 15. At step S350, whether the release button 20 is fully-pushed is determined. If the button 20 is fully-pushed, sound recording starts at step S355. At step S355, until the release button is fully-pushed again or until a predetermined time (for example 30 second) has passed, the sound which is picked up by the microphone 48 is recorded as sound information. Namely, the picked-up sound is converted to digital signals, which are stored as sound information in the RAM 49 through the CPU 41. The stored sound information is read from the RAM 49 and is record in the memory card 47 and then the routine goes to step S360, after the sound record is finished.

At step S360, whether one of the still picture switch 74 and the movie picture switch 73 is activated is determined. If one of these switches 73 and 74 is activated, the routine goes back to step S125, and the selected mode corresponding to the activated switch is set at step S125. At step S365, whether the sound record button 22 has been held down is determined, similar to step S165. If the button 22 has been held down, the power supply is switched off and at step S370.

As described above in this embodiment, both switching the power supply on and off and changing the selected mode are carried out by operating only the mode buttons. Therefore, it is easy for a user to switch the power supply on or off and to change the selected mode. Further, the digital camera 10 does not need to have a power button, which reduces the number of operation devices. Due to this reduction, the frequency of incorrect operations of the operation devices decreases. Furthermore, in this embodiment the power supply is switched off when the button is pushed for a long time. Therefore, the power supply is not switched off by incorrect pushing.

Further, in the sound recording mode, when the still or coving picture button is held down, the lens barrel 14b is extended from the retracted position at first at step S140 (or S240) and then the lens barrel 14b is set to the retracted position again while switching power supply off at step S170 (or s270. Accordingly it is easy for the user to recognize that the power supply is being turned off by the lens barrel 14b extending and retracting.

As described above, at step S160, S260, or S360 the selected mode is changed soon by pushing one of the buttons 22, 23, and 24. On the other hand, the power supply is not switched off until one of the buttons 22, 23, and 24 is pushed continuously for the predetermined time at step S119, S265, or S365. Namely, the input time of the ON-signal for switching the power supply off is longer than the input time of the ON-signal for changing the selected mode.

Furthermore, the operation for switching the power supply off is not limited to the operation as described above. Hence the operation can be another operation if it is different from an operation for changing the selected mode. For example, if two of this ode buttons (buttons 22, 23, and 24) are pushed, the power supply is switched off.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2004-243559 (filed on Aug. 24, 2004) which is expressly incorporated herein, by reference, in its entirety.

The invention claimed is:

1. A camera configured to enter one selected mode of a plurality of modes, when a power supply to said camera is turned ON, the camera comprising:
   a plurality of user operable buttons, each button corresponding to one of said modes, operation of each of the buttons placing the camera in the ON state,
   a power switching processor that switches the power supply ON and OFF, and
   a mode-setting processor that sets a selected mode of said plurality of modes;
   wherein when one of said buttons is operated in a state where the power supply is OFF, said power switching processor switches the power supply ON, and said mode-setting processor sets said selected mode corresponding to said operated button,
   when one of said buttons which does not correspond to said selected mode is operated in a state where the power supply is ON, said mode-setting processor changes said selected mode to a new selected mode corresponding to said operated button, and
   when one of said buttons is continuously operated for a longer time period than a predetermined period when said power supply is ON, said power switching processor switches said power supply OFF.

2. A camera according to claim 1, wherein when said camera is set to a specified mode, said camera carries out a function corresponding to the specified mode, and when said camera is sets to an other specified mode, said camera carries out the function corresponding to the other specified mode.

3. A camera according to claim 1, wherein said plurality of modes includes a still picture mode for photographing a still picture, a moving picture mode for photographing a moving picture, and sound recording mode for recording sound.

4. A camera according to claim 1, wherein said camera has a lens barrel and a camera lens which is provided inside said lens barrel,
   when said mode-setting processor sets a predetermined mode, said lens barrel is set in an extended position, and when said mode-setting processor sets another predetermined mode, said lens barrel is set in a retracted position, and
   when one of said buttons is continuously operated for the longer time period is performed in a state where said mode-setting processor has set said another predetermined mode, said lens barrel is first extended and is then retracted to said retracted position and said power supply is turned OFF.

5. A camera according to claim 4, wherein said plurality of modes includes a still picture mode for photographing a still picture, a moving picture mode for photographing a moving picture, and sound recording mode for recording sound, and
   said predetermined mode is one of said still picture mode and said moving picture mode.

6. The camera according to claim 1, wherein each of said user operable buttons is discrete and said power switching processor is configured to switch said power supply OFF when any one of said discrete buttons is continuously operated for said longer time period.

7. The camera according to claim 1, wherein, when said camera is in said power supply OFF state, operation of any one of said buttons causes said power supply to enter said power supply ON state and, when any one of said buttons is continuously operated for said longer time period, causes said power supply to enter said power OFF state.

8. The camera according to claim 1, wherein, each of said user operable buttons is configured to cause said camera to enter said power ON state, to set selected mode and to enter said power OFF state independently of any other of said plurality of user operable buttons.

9. The camera according to claim 1, wherein, when said camera is in said power ON state, and any one of said plurality of user operable buttons is operated, and said operated button is not associated with the set mode, said camera sets said selected mode corresponding to said operated button and then, upon expiration of said longer time period, switches said power supply to said OFF state.

10. The camera according to claim 1, wherein each of said plurality of buttons, is configured, upon operation, to turn said power supply ON, to set a mode, and to turn said power supply OFF.

11. A camera operable in any one of a plurality of functional modes, said camera comprising:
    a plurality of operationally discrete user operable buttons, each button corresponding to one of said plurality of function modes;
    a power switching processor configured to switch a power supply of said camera between ON and OFF conditions;
    a mode setting processor configured to set a selected mode of said plurality of functional modes;
    wherein; when any one of said buttons is operated and the power supply is OFF, said power switching processor being configured to switch the power supply ON and said mode setting processor being configured to set the mode associated with said operated button,
    wherein when said power supply is ON and any one of said buttons, which is not associated with a presently set mode of said camera is operated, said mode setting processor being configured to change the set mode to a new selected mode associated with the operated button, and
    when any one of said plurality of buttons is continuously operated for a period of time longer than a predetermined period of time said power switching processor is configured to switch the power supply OFF.

12. A camera according to claim 11, wherein, when said camera is set to any one of said modes, said camera performs an operational function corresponding to the set mode.

13. The camera according to claim 11, wherein said plurality of modes comprises a still picture taking mode for photographing a still picture, a moving picture taking mode for photographing a moving picture, and a sound recording mode for recording sound.

14. The camera according to claim 11, wherein said camera includes a lens barrel and a camera lens provided within said lens barrel, wherein, when said mode setting processor sets a predetermined mode, said lens barrel is set to an extended position, and when said mode setting processor sets another of said predetermined modes, said lens barrel is set to a retracted position, and when one of said buttons is continuously operated for the longer time period, in a state where said mode setting processor has set said another predetermined mode, said lens barrel is first extended and is then retracted to said retracted position and said power supply is turned OFF.

15. The camera according to claim 11, wherein each of said plurality of buttons, is configured, upon operation, to turn said power supply ON, to set a mode, and to turn said power supply OFF.

* * * * *